United States Patent [19]
Compton et al.

[11] 3,907,714
[45] Sept. 23, 1975

[54] CATALYST FOR REDUCING NITROGEN OXIDES

[75] Inventors: William A. Compton; Joseph F. Nachman; Manfred I. Seegall, all of San Diego, Calif.

[73] Assignee: International Harvester Company, San Diego, Calif.

[22] Filed: Nov. 16, 1973

[21] Appl. No.: 416,530

[52] U.S. Cl. .............. 252/462; 252/474; 423/213.5
[51] Int. Cl.² ......................................... B01J 23/10
[58] Field of Search ...... 252/462; 423/213.2, 213.5; 75/128 R

[56] References Cited
UNITED STATES PATENTS

| | | | |
|---|---|---|---|
| 3,718,733 | 2/1973 | Gehri | 423/213.2 |
| 3,773,894 | 11/1973 | Bernstein et al. | 252/474 X |
| 3,849,342 | 11/1974 | Santala | 252/462 |

*Primary Examiner*—W. J. Shine
*Attorney, Agent, or Firm*—Strauch, Nolan, Neale, Nies & Kurz

[57] ABSTRACT

Methods of and apparatus for reducing nitrogen oxides which employ self-supporting, catalytically active alloys of metals from Groups IB, III, VIIB and VIII of the periodic table.

13 Claims, 4 Drawing Figures

CATALYST FOR REDUCING NITROGEN OXIDES

The present invention relates to novel, improved methods for eliminating nitrogen oxides from exhaust gases, to novel, improved catalysts for use in such methods, and for novel, improved catalytic converters in which the methods can be carried out.

One of the greatest sources of pollution in this country is the internal combustion engine, particularly in its automotive applications.

Automobile engines release three types of chemical pollutants into the atmosphere: carbon monoxide, nitrogen oxides, and unburned hydrocarbons. Of the total burden of these pollutants added daily to the atmosphere, the automobile accounts for approximately 40 percent of the nitrogen oxides, 60 percent of the unburned hydrocarbons, and 64 percent of the carbon monoxide.

All of the foregoing pollutants are important. The first two are particularly so because they react under the influence of sunlight to form photochemical smog.

One obvious approach to the elimination of exhaust gas pollutants from the atmosphere is to remove them from the exhaust gases before the latter are released into the atmosphere. There are different ways of accomplishing this; one which has proven effective is the catalytic reduction of the nitrogen oxides to nitrogen followed by the oxidation of the carbon monoxide and hydrocarbons to carbon dioxide and water.

To function properly, the catalyst utilized to eliminate the nitrogen oxides must be alternately oxidized and reduced. This is illustrated by the following reactions for the catalytic reduction of NO:

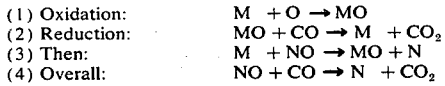

The cyclical conditions necessary for reaction (4) occur in the normal operation of an automobile. During start-up and deceleration, the fuel mixture is lean; and there is excess oxygen in the exhaust. This oxygen causes oxidation of the oxidizable constituents in the nitrogen oxide catalyst. Acceleration, in contrast, causes the fuel-to-air ratio to increase and the exhaust gas to become reducing in character. Reduction of the oxides to the corresponding metals results.

Unfortunately, the cyclic alternation between oxidation and reduction imposes severe mechanical stresses on the catalysts. Those heretofore available therefore tend to spall and agglomerate under cyclical redox conditions, leading to rapid deterioration of the catalyst with a consequent reduction in its effectiveness and a concomitant increase in engine back pressure.

Other drawbacks of heretofore available catalysts are a low degree of effectiveness and usefulness over only a limited temperature range. Such catalysts have also tended to be expensive and susceptible to poisoning and contamination.

The seriousness of these problems and the difficulty of solving them are readily apparent from the high level of and continuing activity in this area. At least 40 U.S. patents issued over a span of as many years are all concerned with the catalytic elimination of nitrogen oxides from internal combustion engine exhausts and related mixtures such as stack gases.

Representative of the foregoing U.S. patents are the following: U.S. Pat. No. 1,962,485 issued June 12, 1934, to Dely for GAS PURIFICATION; U.S. Pat. No. 2,152,473 issued Mar. 28, 1939, to Griffith et al. for TREATMENT OF COMBUSTIBLE GASES; U.S. Pat. No. 2,910,343 issued Oct. 27, 1959, to Childers et al. for PROCESS FOR CATALYTICALLY REDUCING NITROGEN OXIDES IN INDUSTRIAL STACK GASES, U.S. Pat. No. 2,924,504 issued Feb. 9, 1960, to Reitmeier for PROCESS OF REMOVING NITROGEN OXIDES FROM GAS STREAMS OF VARYING COMPOSITION; U.S. Pat. No. 3,259,453 issued July 5, 1966, to Stiles for METHOD AND APPARATUS FOR TREATING EXHAUST GASES OF INTERNAL COMBUSTION ENGINES; U.S. Pat. No. 3,392,034 issued Aug. 13, 1968, to Tulleners et al. for METHOD AND APPARATUS FOR TREATING EXHAUST GASES; U.S. Pat. No. 3,454,355 issued July 8, 1969, to Ryason for METHOD OF REMOVING SULFUR DIOXIDE AND NITROGEN OXIDES FROM GASES; U.S. Pat. No. 3,493,325 issued Feb. 3, 1970, to Roth for PROCESS FOR CATALYTICALLY TREATING EXHAUST GASES; U.S. Pat. No. 3,544,264 issued Dec. 1, 1970, to Hardison for METHOD AND MEANS FOR TWO-STAGE CATALYTIC TREATING OF ENGINE EXHAUST GASES; U.S. Pat. No. 3,739,583 issued June 19, 1973, to Tourtelotte et al. for CONTROL OF NITROGEN OXIDES EMMISSION FROM ENGINES; and U.S. Pat. No. 3,754,270 issued Aug. 28, 1973, to Carnahan et al. for METHODS AND MEANS OF CATALYTICALLY CONVERTING FLUIDS.

In our copending application Ser. No. 431,423 filed Jan. 7, 1974, we disclose novel catalysts for eliminating nitrogen oxides from the exhaust streams of air breathing engines which are free of many of the drawbacks of conventional catalysts. These catalysts are effective over a wide temperature range and are resistant to contamination and poisoning. They are mixtures of rare earth metal oxides and copper (or catalytically active copper oxides) sintered into pellets or coated onto alumina spheres or a comparable support.

We have also invented and disclose herein other novel nitrogen oxide catalysts which also have the advantages of those disclosed in our copending application; viz, a high degree of effectiveness over the wide range of temperatures which the exhaust gases of internal combustion engines may at different times have and a lack of susceptibility to poisoning and contamination.

The catalysts disclosed herein are also more durable than those disclosed in our copending application, and they are capable of restricting the formation of ammonia in the reduction reactions to a lower level.

Increased durability under service conditions is important for obvious reasons.

Minimization of ammonia formation by side reactions between the nitrogen produced in the nitrogen oxide reduction reactions and the hydrocarbons in the exhaust gases is also of great importance. It was pointed out above that the elimination of nitrogen oxides is typically followed by catalytic oxidation to rid the exhaust gases of carbon monoxide and unburned hydrocarbons. In the presence of the oxidation catalyst, ammonia will react with oxygen in the exhaust gases to form nitrous oxide and the even more noxious nitrogen dioxide. Thus, to the extent that ammonia is formed, the goal of eliminating nitrogen oxides is defeated.

Basically, the novel catalysts disclosed herein consist of a metal from Group IB of the periodic table alloyed with a rare earth metal and a metal from Group VIII. We prefer those alloys which contain from 65 to 85 percent nickel, 0.01 to 1.0 percent rare earth metal and a balance copper. Typically, our novel, catalytically active alloys will also contain small amounts of iron.

The alloy is processed into sheet form and then converted into a novel, compact, self-supported configuration through which exhaust gases can flow with a minimum and uniform pressure loss and yet come into maximum and intimate contact with the catalytic material.

Nickel, like all elements having unfilled $d$ bands and copper, possess catalytic activity. Both are known to be capable of reducing nitrogen oxides, and alloys consisting primarily of these metals have heretofore been proposed for the purposes with which this application is concerned (see U.S. Pat. No. 3,565,574 issued Feb. 23, 1971, to Kearby et al. for CATALYTIC CONVERSION OF EXHAUST GAS IMPURITIES). Nickel-copper alloys, however, are among those which are susceptible to rapid deterioration by spalling of surface oxides as the oxides are alternately formed and reduced.

Spalling and similar forms of deterioration are virtually eliminated by the inclusion of a rare earth metal in our novel catalysts. The rare earth metal oxides have much higher free energies of formation than do the oxides of the copper, nickel, and iron typically employed in our novel catalysts. As a consequence, there is a preferential oxidation of the rare earth metal constituent in the oxidation phase of the redox cycle.

Then, during the reduction phase, the copper, nickel, and iron are readily reduced to the elemental metals by the carbon monoxide in the exhaust stream, but the stable rare earth metal oxide resists reduction and, apparently, provides a keying action in the grain boundaries of the alloy. This leads to an oxide film which is more tenacious and, therefore, more resistant to spalling in an environment where it is subject to cyclic thermal conditions and to alternate oxidation and reduction.

We have in conjunction with the foregoing made the important and entirely unexpected discovery that the rapid deterioration of exhaust gas catalysts containing nickel and copper is in large part attributable to the presence of very minor amounts of sulfur in the fuel and, therefore, in the exhaust gas in the form of sulfur dioxide or hydrogen sulfide or both, depending upon the combustion conditions. These sulfur compounds react with the oxides of the transition metals in the catalyst, converting these oxides to the corresponding sulfides, which have much lower melting points than the corresponding oxides, especially in the case of nickel.

The transition metal sulfides tend to segregate in the grain boundaries of the alloy and melt, which leads to rapid propagation of the sulfides throughout the grain boundary network and eventual catastrophic failure of the alloy structure.

We have also unexpectedly found that the adverse effects of sulfur compounds in the exhaust gases can be eliminated by adding from 1 to 15 percent of manganese to the alloy with larger percentages being preferred as a ten percent addition will typically have a two-to-one advantage over a one percent addition in eliminating sulfur induced deterioration of the catalytic alloy at higher temperatures.

Metallographic examination of specimens containing manganese discloses a thin layer rich in manganese sulfides. This layer appears to be tenacious and, also, to protect the transition elements in the catalytic alloy against sulfidation attack.

In laboratory tests the benefits of the manganese addition have been found to remain undiminished in atmospheres containing large amounts of hydrogen sulfide and sulfur dioxide at temperatures as high as 1,800°F. Manganese sulfide has a large free energy of formation and a melting point (2,786°F) above that expected to be encountered in service conditions. While the presence of transition metal and copper sulfides does appear to depress the melting point of the manganese sulfide, the extent to which this occurs does not appear to be of concern.

In addition to making our novel, catalytically active alloys resistant to spalling and other physical deterioration, the oxides of their rare earth metal constituents also materially increase the catalytic activity of the materials. These oxides are themselves active catalysts, and this activity is enhanced in the presence of transition metal oxides such as the nickel and iron which will typically be included in our catalysts.

Also, the rare earth metal constituent appears to enhance the capability for exchange interactions of the unfilled $d$ bands of the transition elements in our catalytic materials and, therefore, the effectiveness of the latter as nitrogen oxide reduction catalysts, which is believed to be a reflection of this capability.

Thus, the rare earth metal oxides enhance in an extreme manner the catalytic activities of both the surface oxides and the metallic interfaces in our catalysts.

At the same time, the inclusion of the rare earth metal in an alloy of the character described above eliminates the drawbacks which are found when such oxides are used alone for our purposes. While these oxides are excellent nitrogen oxide reducing catalysts, the catalytic activity is greatly inhibited by water vapor; and water vapor exists in high proportions in internal combustion engine exhaust gases.

Also, when rare earth metal oxides are used alone in exhaust gas treatment, a high proportion of the nitrogen oxides are converted to ammonia rather than nitrogen. This is unacceptable for, as discussed above, the ammonia is converted back to nitrogen oxides in the subsequent catalytic oxidation step employed to eliminate carbon monoxide and unburned hydrocarbons from the exhaust gases.

Rare earth metals and related elements which have been employed in catalytic materials as described herein include cerium and yttrium. Other rare earth metals of atomic numbers 57–71 and mixtures thereof can be used instead. From 0.01 to 1.0 percent of the rare earth metal constituent is employed as mentioned above.

As discussed above, iron is typically included in our novel catalysts. This element substantially enhances the catalytic activity of the rare earth metal constituent. Iron is employed in amounts of up to 2.0 percent. Larger amounts of iron may, by preferential oxidation, effect an unwanted shift in the composition of the oxide layer, leading to unwanted losses in effectivity and in the tenacity of the oxide film.

The amount of nickel employed in our novel catalysts is selected to obtain a balance between service life, which is extended by increasing the nickel content, and effectiveness in reducing nitrogen oxide, which is promoted by decreasing the nickel content.

Alloys with a nickel content of less than 65 percent have an unacceptably short service life, and a service life increase of several orders of magnitude can be obtained by increasing the nickel content from 65 to 75 percent. Higher concentrations of nickel produce only slight increases in service life at the expense of a considerable decrease in low temperature effectiveness, and the nickel content of our alloys is accordingly limited to the above-mentioned maximum of 85 percent.

From 0.1 to 1 percent of zirconium can also be employed to advantage in our novel catalysts. Increases in service life of up to 25 percent have been realized by addition of this element in the specified amounts. This unexpected increase in service life is believed to be attributable to preferential oxidation of the zirconium at the interface between the metal and the oxide film, the zirconium reinforcing the keying action of the rare earth metal in the alloy.

The following are exemplary alloys suitable for our purposes:

66% Ni, 1.35% Fe, 1% Mn, 0.15% Y, balance Cu
66% Ni, 1.48% Fe, 1% Mn, 0.02% Ce, balance Cu
75% Ni, 1–1.5% Fe, 1% Mn, 0.1% Ce, balance Cu
75% Ni, 1–1.5% Fe, 1% Mn, 0.15% Zr, 0.1% Ce, balance Cu
75% Ni, 10% Mn, 1–1.5% Fe, 0.15% Zr, 0.1% Ce, balance Cu
85% Ni, 1–1.5% Fe, 1% Mn, 0.1% Ce, balance Cu The novel catalytically active alloys described above are rolled or otherwise formed into thin sheets (typically 20 to 30 mills). To the extent that it is consistent with other requirements thinner sheets are preferred. These are less susceptible to deterioration by thermal shock, provide an equal amount of catalytically active surface area with less material, and can be formed to smaller dimensions.

The sheets are formed into elements through which gases can flow with minimum resistance while coming into intimate contact with the catalyst. In one embodiment of the invention, for example, sinusoidal corrugations are formed in the sheets; and the sheets are then disposed between concentric cylindrical spacers of stainless steel, the catalytic alloy, or other material with comparable heat and corrosion resistance, and proper physical properties. Other configurations may also be employed.

Catalytic units which superficially resemble those just described are disclosed in U.S. Pat. No. 3,208,131 issued Sept. 28, 1965, to Ruff et al. for RIGID CATALYTIC METALLIC UNIT AND METHOD FOR THE PRODUCTION THEREOF.

However, closer inspection reveals that the catalytically active elements in the Ruff device are surface coatings, not self-supporting, catalytically active alloys. The Ruff elements would not be satisfactory for our purposes as they would spall and otherwise deteriorate when subjected to the alternating oxidation and reduction conditions and the high temperatures appurtenant to the treatment of internal combustion engine exhaust gases.

Furthermore, the catalytically active materials employed by Ruff are not only considerably different from ours but would not be capable of effectively catalyzing the reduction of nitrogen oxides.

In our novel process of removing nitrogen oxides from exhaust gases, the gases can be brought into contact with the catalytically active materials at temperatures in the range of 700°–1,500°F. Minimum temperatures of 1,050°–1,100°F are preferred, however, as removal efficiencies well above 90 percent can consistently be obtained at these higher minimum temperatures.

From the foregoing it will be apparent that the primary objects of the present invention reside in the provision of novel methods of and apparatus for catalytically reducing nitrogen oxides and in the provision of novel, improved catalysts for use in such methods.

Other important but more specific objects of the invention reside in the provision of nitrogen oxide reduction catalysts in accord with the preceding object:

1. which are highly effective over a wide temperature range;
2. which are not susceptible to contamination or poisoning;
3. which are resistant to physical deterioration at high temperatures and in environments in which they are subjected alternately to oxidizing and reducing conditions and therefore have a long service life;
4. which are relatively inexpensive;
5. which are capable of reducing nitrogen oxides with minimal formation of ammonia;
6. which are self-supporting alloys of a metal from Group IB of the periodic table with a metal from Group VIII and a rare earth metal constituent;
7. which, in conjunction with the preceding object, include manganese in an amount sufficient to protect the catalyst against attack by sulfur compounds present in the gases being treated;
8. which in conjunction with objects (6) and (7) include zirconium in a proportion high enough to provide a significant increase in the service life of the catalyst;
9. which are free from the inhibiting effects exerted on certain heretofore available nitrogen oxide reduction catalysts by water vapor present in gases being treated;
10. which have various combinations of the foregoing attributes.

Yet another important but more specific object of the invention resides in the provision of novel, improved catalytic units through which gases being treated can flow with a minimum of resistance and yet come into intimate contact with the catalytically active components of the unit.

Other important objects and advantages and further novel features of the present invention will become apparent from the appended claims and as the ensuing detailed description and discussion proceeds in conjunction with the accompanying drawings in which:

Figure 1:
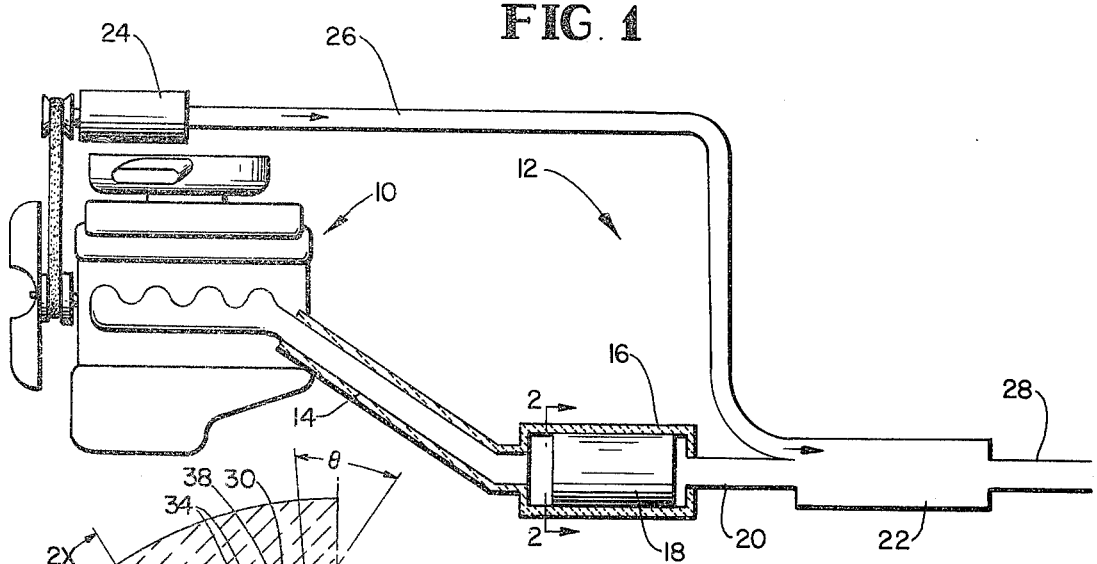
FIG. 1 is a schematic illustration of a system for eliminating pollutants from the exhausts of internal combustion engines, the system including a catalytic converter for reducing nitrogen oxides which is constructed in accord with the principles of the present invention.

Referring now to the drawing, FIG. 1 depicts an internal combustion engine 10 equipped with a system 12 for eliminating noxious constituents from the engine exhaust gases in accord with the principles of the present invention. The exhaust gases are first conducted through insulated pipe 14 to an insulated housing 16 in which a catalytic unit 18 including a catalyst as described herein and capable of reducing nitrogen oxides is located.

After flowing through catalytic unit 18, the exhaust gases, now having a minimal content of nitrogen oxide, flow through a second conduit 20 into a second catalytic converter 22 containing an oxidation catalyst (not shown). Here, carbon monoxide and unburned hydrocarbons are oxidized to carbon dioxide and water. To maximize the efficiency of the oxidation reactions, additional air is added to the exhaust gases in catalytic unit 22 by an engine-driven blower 24, air flowing from the blower through conduit 26 to the inlet side of catalytic unit 22.

After flowing through catalytic converter 22, the exhaust gases, now substantially free of nitrogen oxides, carbon monoxide, and unburned hydrocarbons, are discharged into the atmosphere through exhaust pipe 28.

Figure 2:
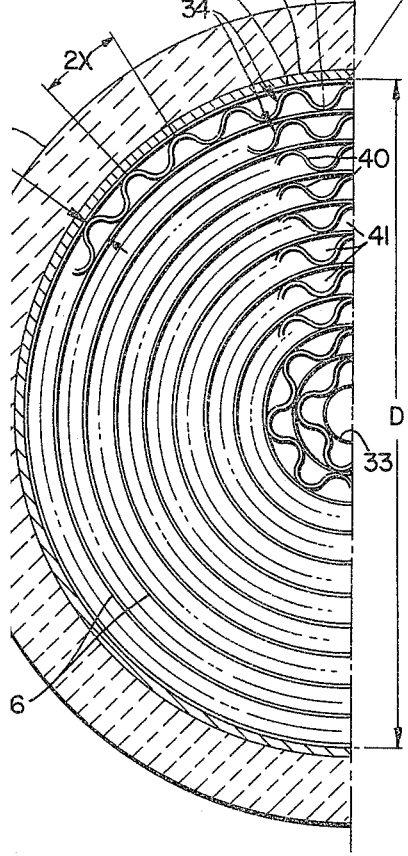
FIG. 2 is a partial section through the catalytic converter taken substantially along line 2—2 of FIG. 1.

FIG. 2 shows in more detail the construction of catalytic unit 18. The housing in which the unit is disposed will typically include a shell 30 surrounded by appropriate insulation 32.

The catalytic unit itself is of honeycomb construction. It includes a plugged, cylindrical mandrel 33, cylindrical members 34 of a catalytically alloy formulated in accord with principles of the present invention and separated by annular spacers 36, and an outer, cylindrical containment member 37.

Parallel corrugations 38 extending in the direction of exhaust gas flow are formed in catalytic elements 34. These passages co-operate with spacers 36 and the mandrel and containment member to form a large number of parallel passages 41 through which the exhaust gases being treated can flow with a minimum of resistance while having maximum surface contact with the catalytically active elements in unit 18.

As mentioned above, elements 34 are fabricated of the novel catalytically active alloys disclosed herein. Spacers 36 may be made of any material which is resistant to oxidation, has reasonable strength at high temperatures, and is economic and readily available. Suitable materials for the spacers are stainless steels and the catalytically active alloys disclosed herein.

The mandrel and containment member can be made of materials of the same character as are suitable for spacers 36, but will typically be fabricated of a stainless steel.

The containment member is employed to keep the other members of catalytic unit 18 from separating under service conditions. This member will in many cases be unnecessary; and it can, in these circumstances, be omitted.

The particular materials employed in catalytic units of the type described herein and the dimensions of such units will of course vary from application to application. Representative, however, is a unit as shown in FIG. 2, which is designed to accommodate the flow from one cylinder bank of an International Harvester 391 CID engine.

In this unit, elements 34 and spacers 36 are made from a catalytically active alloy of the character described herein which is 0.004 inch thick. The central tube or mandrel 38 of the unit is made from ½ inch diameter 321 stainless steel tubing having a 0.058 wall thickness. A plug is welded into the upstream end of the mandrel.

The pitch of the corrugations in elements 34 (X in FIG. 2) is 0.108 inch, and the height of the corrugations (P in FIG. 2) is 0.152 inch.

The unit is 5.0 inches in overall diameter and 9.0 inches long. The pitch angle ($\theta$ in FIG. 2) is 20°.

The area of the catalytically active material contactable by gases flowing through the unit is 60 square feet. The unit weighs 5.43 pounds.

The pressure drop through the unit at an exhaust flow of 700 pounds per hour at 1,500°F is 0.93 inches of mercury as calculated from the following equation:

$$p = 3.198 \times 10^{-6} \, \dot{m} \left[ \frac{H(P+S)}{(D^2-d^2)(P-t)^3} \right] \left[ \frac{1}{\sin^2\theta} + \frac{2}{\sin\theta} + 1 \right] f(\theta)$$

where:
$\dot{m}$ is the exhaust gas mass flow (lb/hr)
$f(\theta)$ is a cell geometry friction factor (1.0625 for = 20°)
$H$ is the length of the unit (in.)
$P$ is the height of the corrugations (in.) (see FIG. 2)
$S$ is the thickness of the spacers (in.)
$D$ is the diameter of the unit (in.)
$d$ is the external diameter of the mandrel (in.)
$t$ is the thickness of the sheet from which the corrugated elements are made (in.)
$\theta$ is the pitch angle (see FIG. 2)

The performance of catalytic units having the configuration of the unit just described and similar configurations can be accurately predicted by a novel empirical formula for ascertaining the performance of our novel catalytic units that we have developed and confirmed by test. This formula states, that, under operational conditions, the efficiency, $E$, of such units is:

$$E = 71.16 \left( \frac{10^5}{\phi_r} \right)^{0.1847} \times R^{0.07125}$$

where:
$\phi_r$ is the core void volume space velocity $$\phi_r = \frac{8.554 \times 10^4 \, \dot{m}}{\frac{\pi}{4} H (D^2 - d^2) - 72A \frac{(t + S \sin\theta)}{(1 + \sin\theta)}}$$

where $A$ is the total area of the corrugated elements and spacers in square feet
$R$ is Reynolds Number $$R = \frac{(P-t) \phi_r (.11528 - 3.010 \times 10^{-5} T)x}{6x + 6.384 (P-t)} \cdot \frac{H}{4.5}$$

where:
$T$ is temperature in °F
$x$ is one-half the pitch of the corrugations the other terms have the meanings assigned above In physical terms the expression "space velocity" which appears in Equation (2) reflects the length of time for which the gases passing through the unit will remain in contact with the catalytically active material. Lower space velocities result in longer contact times and higher efficiencies, all other factors being constant. The space velocity can be lowered by decreasing the mass flow of gas or by increasing the volume of voids.

Equation (2) is subject to the following assumptions:
1. $T > 1,250°F$
2. $5 > \dot{m} \text{ (lb/hr)}/A \text{ (ft}^2) > 2$
3. The engine air-fuel ratio (by weight) is between 13.0 and 13.9
4. The catalytic alloy has been oxidized in air at 1,650°F for a minimum of 3 hours to sensitize it and is in the reduced state.

For the specific unit described above at a nominal exhaust flow rate of 299 lbs/hr.:

$$E = 71.16 \left( \frac{10^5}{161,000} \right)^{0.1847} (154)^{0.07125} = 93\%$$

It is apparent that it can be ascertained from Equation (2) whether a proposed design will be capable of operating with the necessary efficiency.

In employing formula (2) $E$ is limited to a minimum of 70 percent. At lower values of $E$ catalytic reduction of nitrogen oxides in the manner disclosed herein is not practical because the process is not competitive with other processes for eliminating nitrogen oxides. The noble metals, for example, have efficiencies of approximately 75 percent when employed as reduction catalysts for this purpose.

Similar equations can be developed for configurations which differ significantly from that in question, depending upon the accuracy which is needed. Equation (2) will, however, provide reasonably accurate results even for designs which differ considerably in appearance from those shown in FIG. 2.

Figure 3:
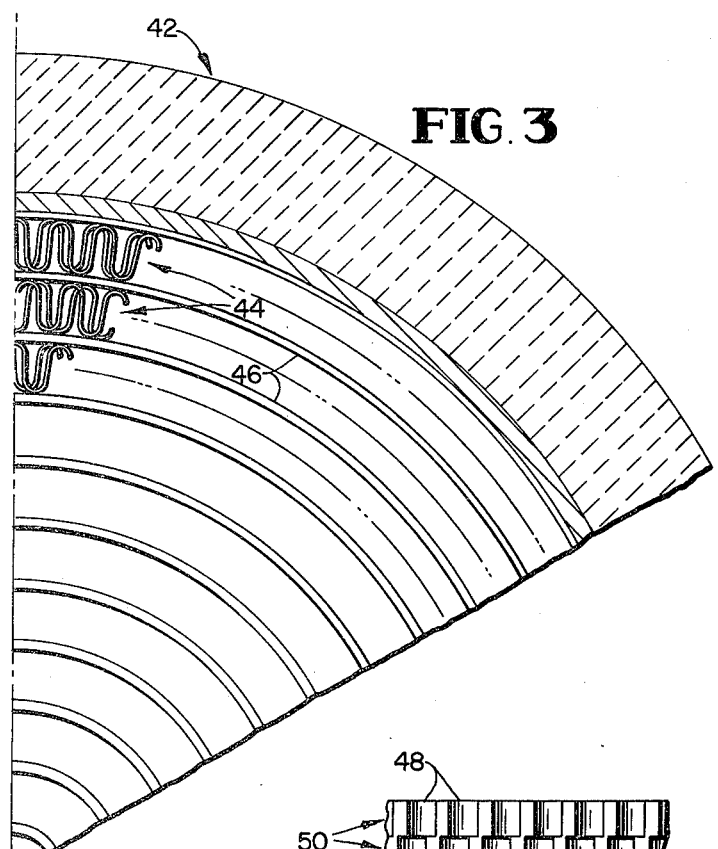
FIG. 3 is a similar partial section through a second form of catalytic converter.
Figure 4:
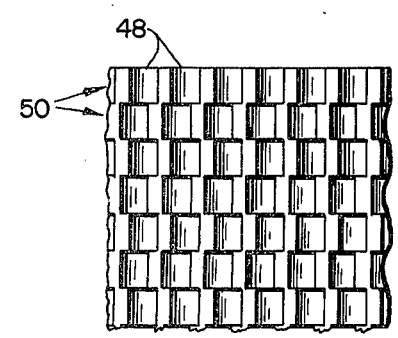
FIG. 4 is a fragmentary plan view of a catalytically active element employed in the catalytic converter of FIG. 3.

Referring again to the drawing, FIGS. 3 and 4 depict a catalytic unit 42 in accord with the principles of the present invention which differs from the unit 18 just described primarily in the configuration of the catalytically active elements 44 disposed between spacers 46. Elements 44 are again of a corrugated construction but differ from the elements 34 described above in that the corrugations 48 in successive segments 50 of each element are displaced laterally relative to the corrugations in the preceding segment by approximately one-half the pitch of the corrugations.

Instead of flowing straight through the catalytic unit, the gases being treated follow a somewhat tortuous path. This causes flow perturbations, and the gases more efficiently contact the catalytically active surfaces of elements 44, thereby promoting the effectiveness of the catalytic unit.

The examples which follow demonstrate the effectiveness of a typical nitrogen oxide reduction catalyst in accord with the principles of the present invention over a wide temperature range (800°–1,400°F).

EXAMPLE I

Twenty mil thick specimens of a $NO_x$ reducing catalytic material consisting by weight of 66.0% Ni, 31.5% Cu, 1.35% Fe, 1.0% Mn and 0.15% Y were heated to various temperatures at a space velocity of 15,000 hours $^{-1}$ in a synthetic exhaust gas mixture constituted as shown in Table II.

Table II

| Composition of Synthetic Gas Mixture for $NO_x$ Catalyst Evaluation Tests | | | |
|---|---|---|---|
| Component | ppm | Percent | Range in Accuracy |
| NO | 1,080 | 0.1 | ± 10% |
| CO | 10,500 | 1.0 | ± 10% |
| $CO_2$ | 160,000 | 16.0 | ± 8.5% |
| $O_2$ | 2,900 | 0.29 | ± 10% |
| $C_3H_8$ | 300 | trace | ± 10% |
| $H_2$ | 530 | trace | ± 10% |
| $H_2O$ | 100,000 | 10.0 |  |
| $N_2$ | 724,690 | 72.5 | ± 10% |

The results of the tests are summarized in Table III.

Table III

| | NO Reducing Efficiency of Ferromagnetic Nickel-Copper Rare Earth Metal Catalyst Alloys as a Function of Temperature in the Synthetic Exhaust Gas Mixture of Table II | | | | | | | |
|---|---|---|---|---|---|---|---|---|
| Temperature °F | CO (%) Before | After | %Loss | NO (ppm) Before | After | %Loss | $CO_2$ (%) Before | After |
| 1400 | 1.28 | 0.10 | 92.2 | 1170 | 80 | 93.2 | 17.4 | 18.2 |
|  | 1.28 | 0.10 | 92.2 | 1170 | 80 | 93.2 | 17.4 | 18.2 |
|  | 1.30 | 0.10 | 92.2 | 1190 | 80 | 93.2 | 17.6 | 18.3 |
| 1400 | 1.23 | 0.11 | 91.1 | 1230 | 85 | 93.1 | 17.4 | 18.2 |
| 1200 | 1.18 | 0.10 | 91.5 | 1170 | 85 | 92.7 | 17.2 | 18.0 |
| 1200 | 1.175 | 0.07 | 94.0 | 1210 | 80 | 93.4 | 17.0 | 18.0 |
| 1000 | 1.27 | 0.18 | 85.8 | 1170 | 80 | 93.2 | 17.4 | 18.0 |
|  | 1.27 | 0.18 | 85.8 | 1190 | 80 | 93.2 | 17.2 | 18.0 |
| 1000 | 1.15 | 0.11 | 90.4 | 1210 | 80 | 93.4 | 17.0 | 18.0 |
| 800 | 1.17 | 0.22 | 81.2 | 1210 | 100 | 91.7 | 17.8 | 18.0 |

In each case the effectiveness of the catalyst in eliminating the nitrogen oxide from the exhaust gas mixture was well above 90 percent, which is excellent.

As discussed above, one of the important features of the novel catalysts described herein is their capability for efficiently reducing nitrogen oxides without generating significant amounts of ammonia. This important attribute of the invention was demonstrated in the tests summarized in the following example.

EXAMPLE II

Twenty mil thick specimens of a $NO_x$ catalytic material consisting by weight of 66% Ni, 31.5% Cu, 0.48% Fe, 1.0% Mn, and 0.02% Ce was heated to 1400°F at a space velocity of 15,000 hrs$^{-1}$ in the gas mixture described in Table II.

The ammonia generated during the tests was measured by titration with 0.04 N hydrochloric acid to a Brom Cresol endpoint.

The results are shown in Table IV.

Table IV

| Ammonia Formation for Ni-Cu Rare Earth Metal Alloy at T= 1400°F and Gas Flowrate of 9 liters/min | | | |
|---|---|---|---|
| Run | Titration Period (min) | Ammonia (ppm) | Average (ppm) |
| 1 | 10 | 14.0 |  |
| 2 | 10 | 11.5 | 10.8 |

Table IV-continued

Ammonia Formation for Ni-Cu Rare Earth Metal Alloy at
T= 1400°F and Gas Flowrate of 9 liters/min

| Run | Titration Period (min) | Ammonia (ppm) | Average (ppm) |
|---|---|---|---|
| 3 | 10 | 7.0 | |

The NO reducing efficiency of this catalyst was 93 percent for the stated conditions (see Table II.) Since the efficiency is defined as [NO] start − [NO] end/[NO] start × 100% and the original NO concentration ([NO] start) was 1,080 ppm, it is apparent that less than one percent of the reduced nitrogen oxide was turned into ammonia.

It was pointed out above that resistance to deterioration under operating conditions is another important attribute of the novel catalytically active materials disclosed herein because of the extended service life and greater effectivity which results. The superior resistance of our novel materials to deterioration under service conditions is demonstrated by the tests summarized in the following example.

EXAMPLE III

Catalyst Life $NO_x$ reducing catalysts of the compositions identified in Examples I and Ii and Monel metal were melted in an inert atmosphere into 150 grams buttons. These buttons were hot rolled at 1,400°F to half their original thickness, i.e., to about one-fourth inch. After conditioning the surface by light grinding, a final rolling was accomplished cold to a thickness of approximately 30 mils.

The 30 mil thick samples were subjected to alternate oxidation for 17 hours and reduction for 6 hours, both at 1,500°F, for over 100 hours. The oxidation atmosphere was air, and the reducing atmosphere a mixture of 9% CO—91% $N_2$, flowing through a vented retort at 10 cubic feet per hour. Weight change was recorded after each oxidation-reduction cycle.

The Monel metal sample lost 14 percent of its original weight over the course of the test. In contrast, the catalytic material of the present invention containing 0.05 yttrium lost only 1.5% and our catalytic material containing 0.02% cerium actually experienced a 2% gain in weight. In both cases the weight loss performance was markedly superior to that of the Monel metal catalyst.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A catalytically active alloy, comprising nominally, by weight, from 65 to 85 percent nickel, from 0.01 to 1 percent rare earth metal or mixture of rare earth metals, and the balance copper.

2. A catalytically active alloy according to claim 1, containing from 1 to 15 percent by weight of manganese.

3. A catalytically active alloy according to claim 1, containing from 0.1 to 1 percent by weight of zirconium.

4. A catalytically active alloy according to claim 1, containing iron in an amount of not more than 2 percent by weight.

5. A catalytically active alloy according to claim 1, wherein the rare earth metal is cerium or yttrium or a mixture thereof.

6. A catalytically active alloy, comprising nominally, by weight, on the order of 75 percent by weight nickel, 10 percent manganese, 1–1.5 percent iron, 0.15 percent zirconium, 0.1 percent cerium, and the balance copper.

7. A catalytically active alloy, comprising nominally, by weight, on the order of 85 percent nickel, 1 to 1.5 percent iron, 1 percent manganese, 0.1 percent cerium, and the balance copper.

8. A catalytically active alloy, comprising nominally, by weight, on the order of 75 percent nickel, 1 to 1.5 percent iron, 1 percent manganese, 0.15 percent zirconium, 0.1 percent cerium and the balance copper.

9. A catalytically active alloy, comprising nominally, by weight, on the order of 75 percent nickel, 1 to 1.5 percent iron, 1 percent manganese, 0.1 percent cerium, and the balance copper.

10. A catalytically active alloy, comprising nominally, by weight, 66 percent nickel, 1.35 percent iron, 0.15 percent yttrium, and the balance copper.

11. A catalytically active alloy, comprising nominally, by weight, 66 percent nickel, 1.48 percent iron, 1 percent manganese, 0.02 percent cerium, and the balance copper.

12. A catalytically active alloy, comprising nominally, by weight, from 65 to 85 percent nickel, 1 to 15 percent manganese, 0.1 to 1 percent zirconium, 0.01 to 1 percent of a rare earth metal or a mixture of rare earth metals, not more than about 2 percent iron, and the balance copper.

13. A catalytically active alloy according to claim 12 in which the rare earth metal is cerium.

* * * * *